United States Patent [19]

Savino

[11] Patent Number: 5,531,316

[45] Date of Patent: Jul. 2, 1996

[54] CONVEYOR BELT AND METHOD OF MAKING SAME

[75] Inventor: Mark Savino, Wausau, Wis.

[73] Assignee: Bearings, Inc., Cleveland, Ohio

[21] Appl. No.: 391,059

[22] Filed: Feb. 21, 1995

[51] Int. Cl.[6] .................................................. B65G 15/34
[52] U.S. Cl. ......................................................... 198/844.2
[58] Field of Search ............................ 198/844.2; 24/332

[56] References Cited

U.S. PATENT DOCUMENTS

| | | |
|---|---|---|
| 3,342,656 | 9/1967 | Papageorges . |
| 3,351,508 | 11/1967 | Baxendale . |
| 3,546,054 | 12/1970 | Ross . |
| 4,032,384 | 6/1977 | Rauscher . |
| 4,034,617 | 7/1977 | Guyer .............................. 198/844.2 X |
| 4,056,419 | 11/1977 | Paine . |
| 4,506,429 | 3/1985 | Gutschmit . |
| 5,246,100 | 9/1993 | Stone et al. . |

FOREIGN PATENT DOCUMENTS

| | | | |
|---|---|---|---|
| 0064909 | 3/1989 | Japan | 198/844.2 |
| 3138209 | 6/1991 | Japan | 198/844.2 |
| 4277111 | 10/1992 | Japan | 198/844.2 |

Primary Examiner—James R. Bidwell
Attorney, Agent, or Firm—Vickers, Daniels & Young

[57] ABSTRACT

A continuous conveyor belt of the type useful for transporting materials such as paper products from one location to another, and including a polyamide core and elastomerized top and bottom surface coatings on the core, is formed into a continuous band by a process which involves the use of a hot melt foil sheet placed between the ends of the belt. The foil sheet includes a polymer material which softens under heat and pressure, and which solidifies when cooled to bond together the ends of the belt. Typically each end of the belt is feathered, and the ends are juxtaposed in an overlapping relationship with the foil sheet therebetween. Temperatures of 325°–425° F. (163°–218° C.) are typically used to soften the adhesive.

23 Claims, 3 Drawing Sheets

CONVEYOR BELT AND METHOD OF MAKING SAME

This invention relates to a conveyor belt and particularly to a continuous conveyor belt comprising a core of a polyamide material, and a coating of an elastomerized or polymerized material which gives the belt a friction surface that is ideally suited for the movement of goods such as paper stock. More particularly the invention relates to the means of joining the ends of a conveyer belt by feathering the ends, overlapping them and splicing them together using a hot melt adhesive foil for bonding.

BACKGROUND OF THE INVENTION

Conveyor belts are used in literally hundreds of different applications ranging from the movement of large pieces of equipment between one production operation and another, to the transportation of persons from point A to point B, to many warehousing operations for placing inventory into stock and removing the inventory from stock. The continuous movement of conveyor belts over and around rollers, along with the repetitious start-ups and slow downs, the placing of loads thereon, and the removal of the loads therefrom, all cause wear, tear and fatigue to the belt. Fatigue and breaking of the belt is most likely to occur in the area where the ends of the belt are joined or spliced together. With the frequent changes of speed and the loads that are being carried by the belt, the belt is constantly being subjected to tension, often resulting in stretching or elongation of the belt. When a conveyor belt becomes elongated to the point where it is no longer able to be used without excessive slipping or removal from the beltway, the belt must be replaced. An alternate option is to stop the production line, remove a section of the belt and rejoin the ends of the belt. The time during which a conveyer line is shut-down while the belt is being repaired or replaced is non-productive and can contribute to increased overhead costs.

Conveyor belts are made from a wide variety of materials to meet a myriad of differing needs. The type of belt to which the present invention is applicable is the kind utilizing a polyamide core covered with one or more layers of a synthetic rubber or polymer such as polychloroprene, polyurethane, etc.

The polyamide core is preferably selected from the group comprising condensation products of adipic acid and hexamethylenediamine, and polymerized caprolactum.

Conveyer belts are fabricated according to techniques that are well known and documented in the art; thus, these techniques do not comprise any portion of the present invention. Typically, the core or carcass of the belt is comprised of a polymer in the form of elongated fibers or strands or as a solid sheet having an orientation in the longitudinal direction of the belt to provide high strength and elongation resistance. Nylon, a polyamide, in the form of fibers, strands, fabrics or a solid flexible sheet is commonly used as a core material because of its high breaking strength and low module of elasticity.

The top surface of the core is covered with an elastomeric coating having a co-efficient of friction which is suitable for the intended end use of the belt. The bottom surface of the core typically is covered with a layer of an elastomeric compound having the flexibility and wearability to repeatedly pass over around and through rollers without premature failure. Each surface of the core is covered simultaneously or sequentially by well known techniques such as passing the cover layer and core through pinch rolls to laminate the two together, using heat and/or adhesives to produce a strong bond. Among the compounds found to be useful for the surface coating on conveyer belts are natural rubber, butyl rubber, neoprene, styrene-butadiene rubber, polyvinyl chloride, ethylene-propylene rubber, polyesters, and polyurethane.

In the past, a variety of methods has been used to join or butt together the two ends of the belt. Some of these methods have employed mechanical means such as staples, flexible links, and tongue and groove joints, while others are based on the use of suitable chemical bonding agents such as hot melt adhesives to join together the ends of the belt.

Among the hot melt adhesives used for this purpose are thermoplastic polymers such as polyamides, polyolefins or polyesters modified with waxes, processing aids and other additives to change or control the flow characteristics of the adhesive. In use, the adhesives are heated to temperature at which they become soft and/or flowable. When cooled, they solidify to bond together the ends of the belt.

One problem arising from the use of belts comprising two or three different materials is finding a common adhesive that can be used to bond together the ends of the polyamide core material and to bond the surface coatings to themselves. Often, it is found that two separate cements must be used, one used to bind the core and another to cement the surface coatings. Another drawback with the use of these cements is that many are solvent based cements rather than water based. This contributes to a greater need for adequate ventilation during the splicing process, particularly if heat is used. If a flammable solvent is used in the cement or for cleanups, extra precaution is needed to prevent accidental flash fires.

In addition, it has been found that there is a tendency of the edges of the belt to curl, when the use of two separate cements is required. This curling of the edges may result in premature failure of the splice. Still another problem is the tendency of the belt, in the area of the splice, to be less flexible than the remainder of the belt, resulting in undue stress and strain on the belt particularly in the area of the splice. Yet another problem is the tendency of the belt, in the area of the splice, to become elongated, thereby resulting in early failure or slippage of the belt particularly around the drive roller. Coupled with these drawbacks is the added time required to repair the belts when using two types of adhesive cements.

SUMMARY OF THE INVENTION

The drawbacks of the prior art methods of splicing conveyor belts are overcome in a manner to be hereinafter described with particular reference to the drawings and the detailed description.

Briefly the invention relates to a method of joining two ends of a length of conveyer belt, said belt composed of a polyamide core and a cover layer surrounding said core. The method comprises the use of a thin foil of a hot melt adhesive between the two end surfaces of the belt, said foil comprising a polymeric substance that bonds together the two ends, when subjected to a combination of heat and pressure. Each end of the belt is skived or champfered to provide a leathered edge and a large contact surface for bonding. The two feathered ends of the belt are then overlapped with the foil placed therebetween, and are subjected to heat and pressure until the foil melts or softens to a flowable consistency. The splice is allowed to cool whereupon the adhesive solidifies, securely bonding the ends together.

A foil that has been found to be suitable for the teachings of the present invention is sold by Seigling Akt., a company located in Hanover, Germany, under the trade name Extrebond™ Hot Melt Foil. The foil sheet has a thickness in the range between about 0.2 and about 0.6 millimeters. It is represented by Siegling Akt. to be non-toxic and nonhazardous. The two ends of the belt are cut at the same angle, ranging between about 60 and about 90 degrees with respect to the longitudinal direction of the belt. The skived or scarfed ends of the belt are overlapped with a piece of foil cut to the size of the skived surface sandwiched therebetween. The mated ends of the belt are then subjected to elevated temperature and pressure to cause the foil to melt or soften. The splice is then cooled whereupon the adhesive solidifies and the ends are completely bonded together. Typically, the splice is heated to a temperature in the range of between 325° F. (163° C.,) and 425° F. (218° C.); preferably about 375° F. (191° C.).

In another aspect of the invention, an endless conveyor is composed of an elongated belt having first and second ends, the belt comprising a core of a polyamide material and a surface coating comprising an elastomerized material providing a suitable surface for the type of goods to be transported on the belt. The conveyor belt is improved by splicing the two ends of the belt together utilizing a bonding agent comprising a thin flexible foil of a hot melt adhesive. The two ends of the belt are skived to provide feathered edges and are cut at identical angles before being overlapped with the foil therebetween. The overlapped skived ends of the belt are then heated for about two minutes per inch of belt width to a temperature between 325° F. and 425° F. (163° and 218° C.). The splice is then cooled to room temperature to solidify the adhesive.

One of the objects of the present invention is to provide an improved conveyor belt for use on paper converting machinery and other related equipment.

Another object of the present invention is to provide a continuous conveyor belt having flexibility through the splice area comparable to that of the rest of the belt.

Still another object of the present invention is to increase the life of the conveyor belt, in the splice area, over that presently available using prior art splicing techniques.

Yet another object of the invention is to provide a conveyor belt in which the rate of elongation of the belt in the area of the splice is comparable with that of the belt as a whole.

Yet another object of the present invention is to provide predictably uniform splices from one belt to another.

Still another object of the present invention is to provide a means for on-site assembly or repair of conveyer belts, thereby reducing inventory, particularly if several conveyers of different lengths but of the same width are used.

Another object of the present invention is to eliminate the need to use cements, such as solvent based splicing cements for joining the ends of the belt, thereby resulting in a cleaner, safer, and less hazardous working environment.

Still another object of the present invention is to minimize or eliminate the problem of edge curls in the area of belt splices, a common problem with prior art methods.

These and other objects are achieved in the manner to be hereinafter described in greater detail, with particular reference to the drawings.

DETAILED DESCRIPTION OF THE INVENTION

The present invention relates to conveyor belts of the type typically used in conveying paper goods for various manufacturing or processing operations or equipment such as book binding machines, collators, printers, edge gluing machines, foil wrapping machines, folders, seaming machines and envelope machines, labeling machines, laminating machines, cross cutters and slitters, sack making machines, sheet feeders and dischargers, sheet lining machines, sorters, stackers, winders, and unwinders.

The invention is particularly useful on belts comprising a polyamide core, and an elastomeric friction coating. An example of a commercially available belting material of this type is sold by Siegling Akt. as Extremultus layboy tape, type GG2, GG4 or GG6. The supplier's recommended procedure for splicing these tapes is to scarf or skive the overlapping edges of the tape, followed by placing the ends of the tape in a heating clamp for ten minutes at 248° C. This is followed by applying cement to the spliced laps, a thin coating of one type of cement to the elastomer surfaces and a second coating of a different type of cement to the polyamide core. The lapped splice is then placed in a heating clamp and is subjected to heat and pressure for approximately fifteen minutes.

Instead of using the manufacturer's recommended procedure for splicing the two ends of the tape, the present invention describes a faster, simpler and more consistent procedure, to be hereafter described in greater detail with particular reference to the drawings.

Figure 1:
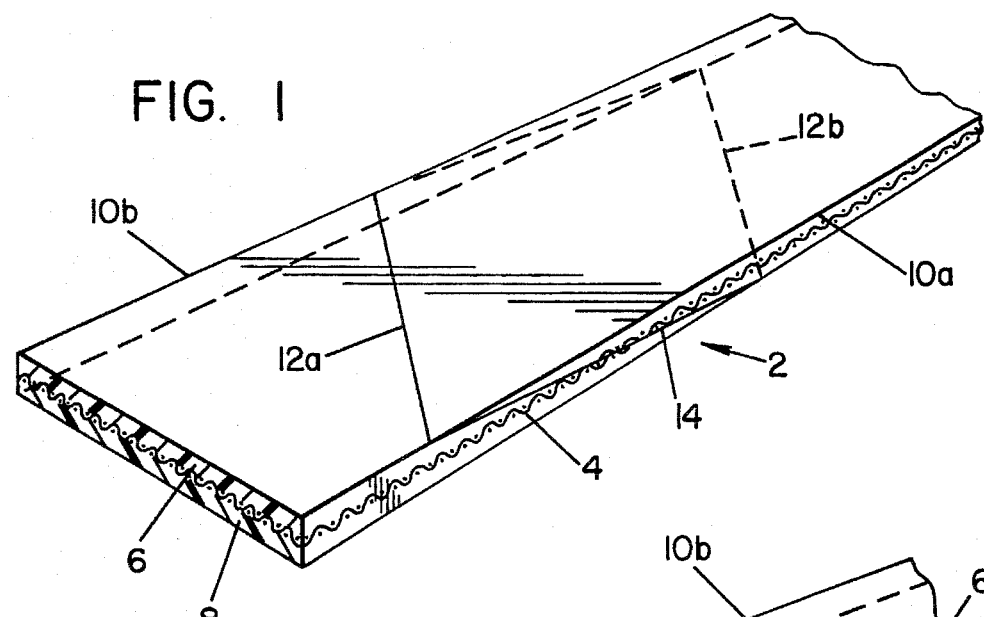
FIG. 1 shows a spliced segment of a conveyer belt.

Referring now to FIG. 1, a conveyer belt of the type to which the present invention appertains, is shown. The belt 2 comprises a core 4 of a polyamide material, with a surface layer or coating 6 on the top surface and a surface layer or coating 8 on the bottom surface of the core 4. The belt is shown with ends 12a, 12b joined together to form splice 14. The width of the belt equals the distance between belt edges 10a and 10b.

Figure 7:
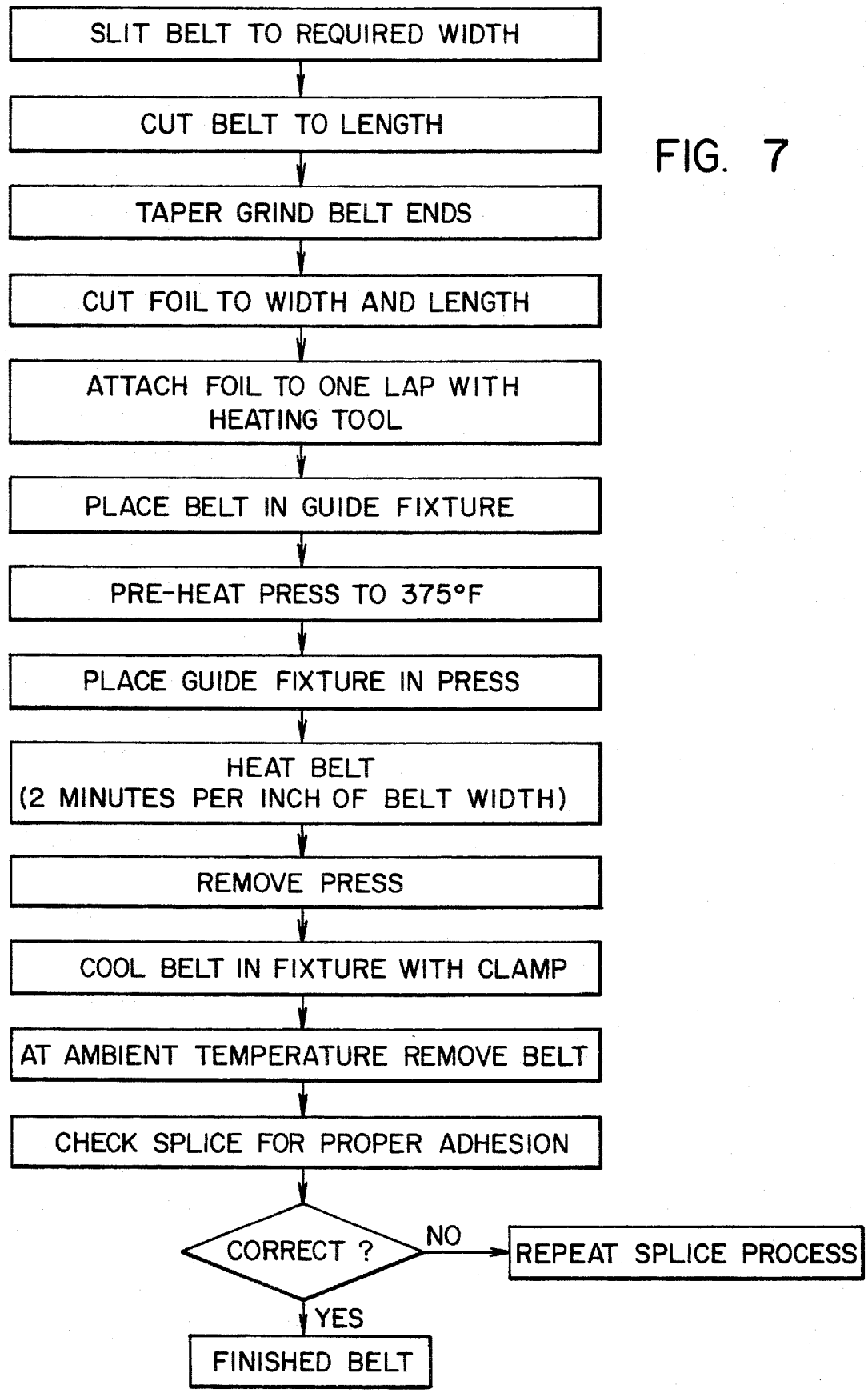
FIG. 7 is a detailed flow diagram describing the operational steps involved in the splicing procedure of the present invention.

The process steps of the present invention are shown in FIGS. 2–5, and are described in the flow diagram, FIG. 7. The first step comprises slitting or cutting the belt to the required width, as determined by the requirements of the conveyer system. Obviously, this step is omitted if the belt is bought from the manufacturer in the width required for the conveyer system. The belt is then cut to the required length, again determined by the dimensions of the conveyer system. Preferably, the belt is cut at an angle of about 90° to about 60° with respect to the longitudinal direction of the belt (0°–30° with respect to the belt width) according to techniques well known in the art. Both ends are cut at the same angle and are parallel to one another.

Figure 2:
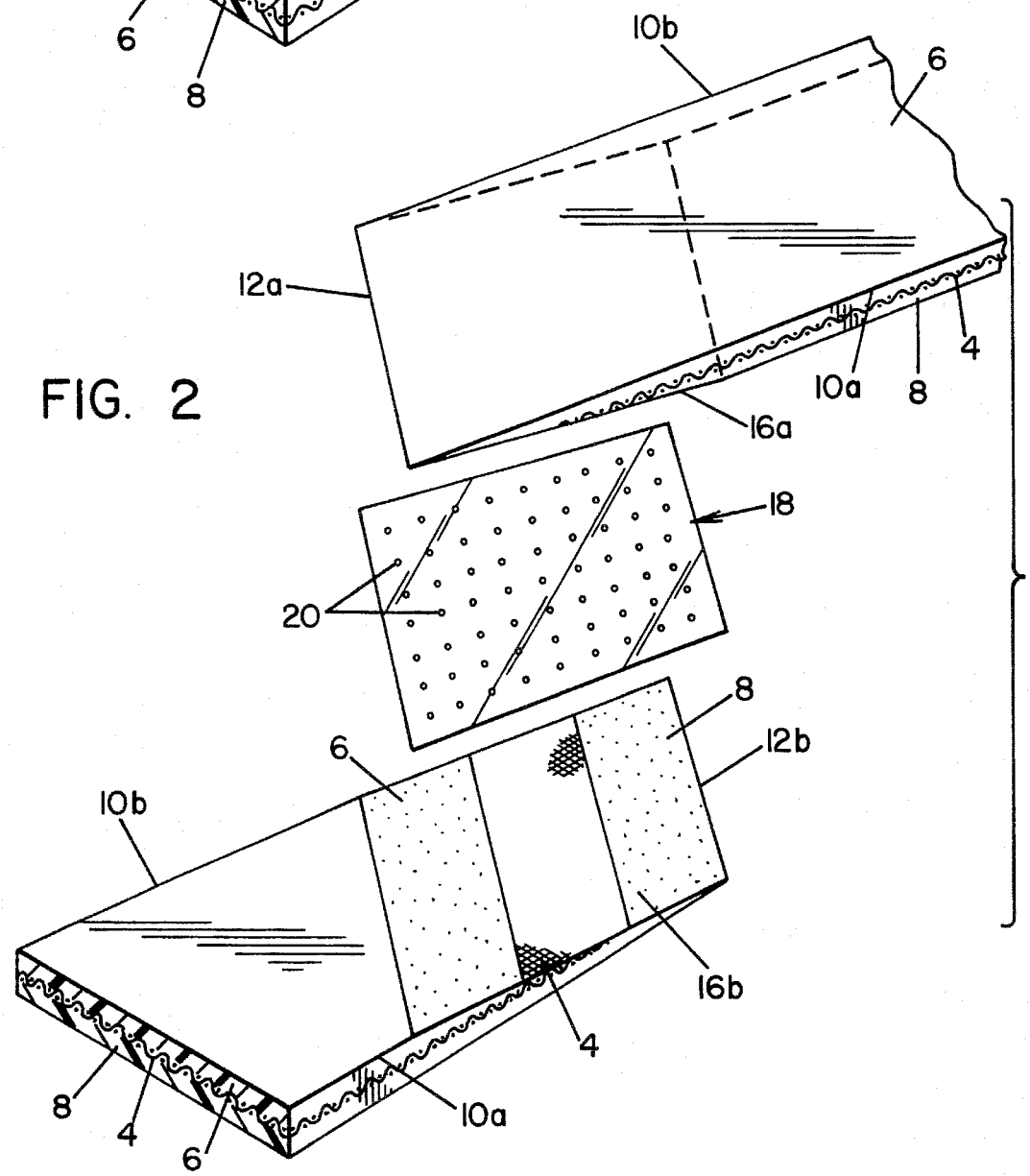
FIG. 2 is an exploded view showing two scarfed ends of the conveyer belt prior to being bonded together.
Figure 3:
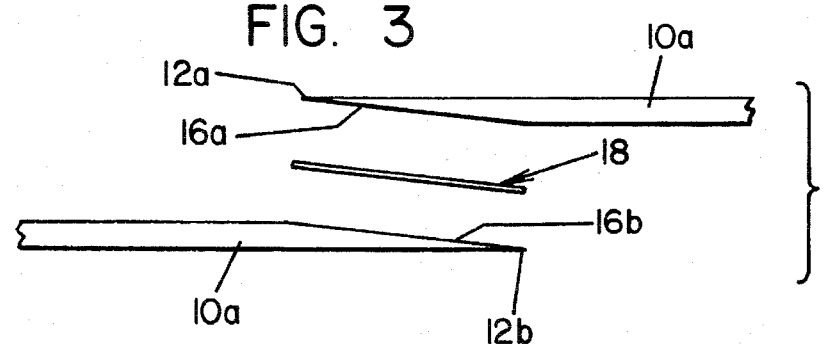
FIG. 3 is a side view of a conveyer belt showing the ends thereof prior to being assembled, with a hot melt foil therebetween.
Figure 4:
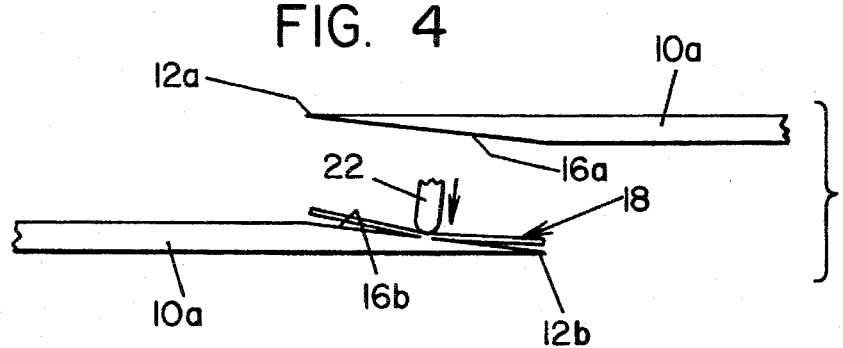
FIG. 4 is another side view showing the hot melt foil being preheated and adhered to one of the ends of the conveyer belt.
Figure 5:
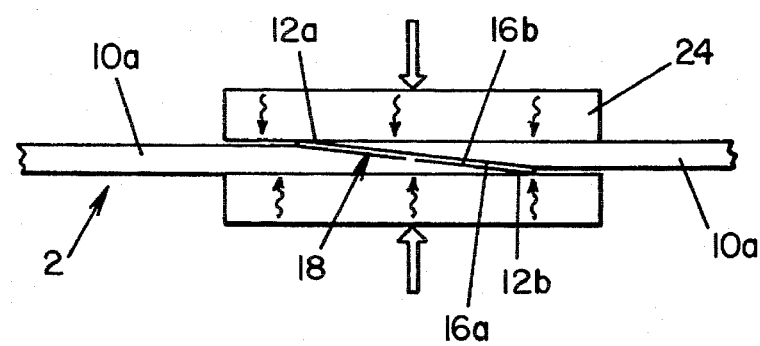
FIG. 5 is another side view showing the ends of the belt being fused together in a heater.

The next step comprises grinding or scarfing the ends of the belt to form two complementary beveled or tapered surfaces 16a, 16b. FIG. 2 shows beveled surface 16b with portions of the surface coatings 6 and 8 as well as a portion of the core 4 being exposed. A side view of these beveled surfaces is shown in FIGS. 3 and 4, with the foil 18 therebetween. Each of the beveled surfaces are prepared according to techniques well known in the art using a suitable grinder such as an Extremultus™ Grinder ES3, ESM5, or ESM10, depending upon the width of the tape. These grinders are available from Siegling Akt. A 50 grain grinding disk has been found to be suitable for this purpose.

In the next step, a piece of Extrebond™ hot melt foil 18 is cut to the width of the belt and the length of the scarfed or tapered surfaces to be joined. The foil as received contains numerous small perforations 20. The foil is adhered to one of the beveled surfaces of the belt 2, as shown in FIG. 4, using a suitable heating device 22 such as the Eagle UP-50 hand-held heating tool, sold by Eagle Belting Co., Des Plaines, Ill. The ends of the belt are then joined, preferably by placing them in a guide fixture (not shown) to ensure accurate alignment of the two ends of the belt. The guide fixture is then put into a press 24, preheated to a temperature of between about 325° and 425° F. (163°–218° C.), preferably about 375° F. (191° C.). See FIG. 5. A press sold by Habasit Belting Co., Reinach-Basel, Switzerland, Model No. PQ 52 or PQ 82 has been found to be suitable for this purpose. The press is spring loaded to ensure that a uniform pressure is exerted on each splice, thereby minimizing splice-to-splice variations. The guide fixture is also available from Habasit Belting Co., and is selected according to the width of the belt being spliced.

In the next step, the splice is heated for a period of time equal to about 2 minutes per inch of belt width, whereupon the foil softens and flows into the interstices of the scarfed surfaces. The belt is then removed from the press and is allowed to cool, preferably while being held in a cooling clamp such as a Habasit CD 54. Cooling is continued until ambient temperatures are reached.

Figure 6:
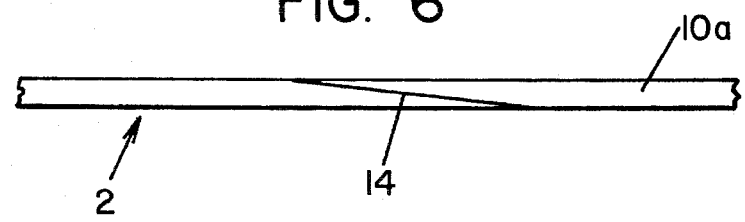
FIG. 6 is a side view showing the finished splice.

The belt is then removed from the clamp and is inspected to be sure that the ends of the belt are properly adhered to each other. FIG. 6 shows a portion of a belt spliced according to the invention. If the splice is defective in any way, the ends are separated, and the splicing process is repeated, using a fresh strip of hot melt foil. If the adhesion is adequate, the belt is then ready for use.

It should be understood that the invention is not limited to the embodiments that are specifically mentioned herein, but likewise is usable in joining together the ends of belt made of materials similar to but not necessarily identical to the materials that go into the fabrication of the Extremultus polyamide layboy tapes.

As previously mentioned, the present invention provides a splice that maintains the flexibility comparable to that of the remainder of the conveyer belt, does not stretch or elongate at a rate or in an amount that is any greater than that of the remainder of the belt, and is sufficiently strong to provide a belt that maintains a lifetime at least equal to, and often greater than, the life of belts containing splices made by the prior processes. Furthermore, the invention shortens the time required to make the splices and eliminates or minimizes the evolution of possibly harmful volatiles during splicing.

What is claimed is:

1. In a continuous conveyor belt having a longitudinal axis and comprising an elongated tape with a first end and a second end spliced together, said tape comprising a polyamide core and an elastomerized surface coating on said core, the improvement wherein each end of the belt is feathered at a non-perpendicular angle relative to the longitudinal axis of said belt to provide opposed feathered surfaces in overlapping relationship with no overall increase in the thickness of the belt, said feathered surfaces being bonded together with a hot melt foil adhesive.

2. A belt according to claim 1 wherein the hot melt foil adhesive having a thickness in the range between about 0.2 and about 0.6 millimeters is employed to bond together the surfaces.

3. The belt according to claim 1 wherein the polyamide core is selected from the group comprising the condensation product of adipic acid and hexamethylenediamine, and polymerized caprolactum.

4. In a conveyor belt having a longitudinal axis and comprising an elongated continuous strip having a first end and a second end and a splice between said ends, said belt comprising a core of a polyamide material and a surface coating comprising an elastomeric material providing a friction surface for objects placed on the belt, the improvement wherein said first end and said second end are tapered and have an angle relative to said longitudinal axis such that the sum of the two angles is about 180 degrees, said splice including the two tapered ends of the belt in overlapping relationship with one another with no overall increases in the thickness of the belt and a bonding agent comprising a thin flexible foil of hot melt adhesive between and bonding said tapered ends together.

5. The conveyor belt according to claim 4, wherein each of the two tapered ends 180 angles, one of said angles between about 0 and about 30 lie in a plane inclined laterally and longitudinally with respect to the longitudinal axis of the belt.

6. The conveyor belt according to claim 5 wherein the splice is subjected to heat and pressure to soften the foil and is then cooled to solidify the bond.

7. The conveyor belt according to claim 6 wherein the splice is heated to a temperature between about 325° F. (162° C.) and about 425° F. (218° C.).

8. In a method of joining two ends of an elongated belt having a thickness and a longitudinal axis and comprised of a core of a polyamide material, and a cover layer on the surfaces of said material, said cover layer providing a non-slip surface, the improvement comprising: providing a thin foil of a hot melt adhesive between the ends of the belt, tapering said ends at a non-perpendicular angle relative to the longitudinal axis of said belt, positioning the tapered ends of the belt with the foil therebetween with no overall increase in the thickness of said belt, subjecting the ends of the belt and the foil to heat until said foil is softened, and thereafter cooling the foil and ends to solidify said adhesive whereby the ends are bonded together.

9. The method according to claim 8 wherein the foil sheet before heating has a thickness in the range of between about 0.2 and about 0.6 millimeters.

10. The method according to claim 9, wherein the ends are overlapped with the foil therebetween to form a splice having the same thickness as the belt, and tapering said ends for said splice to lie in a plane inclined both laterally and longitudinally with respect to said axis.

11. The method according to claim 9 wherein the heating of the ends is carried out at a temperature between about 325°–425° F. (163° C. and 218° C.).

12. The method according to claim 11, wherein the heated is heated to a temperature of about 375° F. (192° C.) for a period of time equal to about 2 minutes per inch of belt width.

13. The method of joining two ends of a belt with essentially no overall increase in the thickness of the belt, said belt comprising a core of polymer material and a cover layer on the surface of said polymer material, said cover layer providing a non-slip surface, said method comprising the steps of:
   a) cutting said belt to a desired length and width, said belt having two ends and a longitudinal axis;
   b) tapering the two ends of said belt for each belt end to have a tapered surface in a plane inclined both laterally and longitudinally relative to said longitudinal axis;
   c) applying a foil sheet of hot melt adhesive on one of said tapered surfaces;
   d) overlying the other of said tapered surfaces on said foil such that said two ends are in an overlapping relationship with said foil disposed between said two tapered surfaces; and
   e) applying heat to said cover layer of said belt until said foil melts and adheres together said tapered surfaces.

14. The method as defined in claim 13, wherein said plane of said tapered surface is laterally inclined about 30 degrees relative to said longitudinal axis.

15. The method as defined in claim 13, wherein said core includes a polyamide material.

16. The method as defined in claim 15, wherein said polyamide material is selected from the group comprising the condensation product of adipic acid and hexamethylenediamine, and polymerized caprolactum.

17. The method as defined in claim 13, wherein said cover layer includes a material selected from the group consisting of natural rubber, butyl rubber, neoprene, styrene-butadiene rubber, polyvinyl chloride, ethylene-propylene rubber, polyesters, polyurethane, and mixtures thereof.

18. The method as defined in claim 13, including the step of cutting said foil to the width of said belt and to the length of said tapered surfaces.

19. The method as defined in claim 13, including the step of applied pressure to said cover layer as said heat is applying to said cover layer.

20. The method according to claim 13, wherein the foil sheet before heating has a thickness in the range of between about 0.2 and about 0.6 millimeters.

21. The method according to claim 13, wherein the heating of the cover layer is carried out at a temperature between about 325°–425° F. ( 163° C. and 218° C.).

22. The method according to claim 21, wherein the cover layer is heated to a temperature of about 375° F. (192° C.) for a period of time equal to about 2 minutes per inch of belt width.

23. An endless conveyor belt comprising an elongate strip of belt material having longitudinally opposite ends, laterally opposite side edges, top and bottom surfaces and a splice between said ends, said belt material comprising a polyamide core and a surface coating of elastomeric material, and said splice comprising laterally and longitudinally overlapping tapered surfaces on said opposite ends and a foil of hot melt adhesive between and bonding said tapered surfaces together, each of said tapered surfaces lying in a plane which is inclined relative to said top and bottom surfaces and relative to said opposite side edges.

* * * * *